(12) United States Patent
Sakurai

(10) Patent No.: US 10,185,904 B2
(45) Date of Patent: Jan. 22, 2019

(54) INFORMATION PROCESSING APPARATUS FOR SETTING AN ATTRIBUTE OF A PIXEL BASED ON A CONFORMITY BETWEEN PIXEL VALUES OF OBJECTS, INFORMATION PROCESSING METHOD FOR SETTING AN ATTRIBUTE OF A PIXEL BASED ON A CONFORMITY BETWEEN PIXEL VALUES OF OBJECTS, AND NON-TRANSITORY COMPUTER READABLE MEDIUM FOR SETTING AN ATTRIBUTE OF A PIXEL BASED ON A CONFORMITY BETWEEN PIXEL VALUES OF OBJECTS

(71) Applicant: CANON KABUSHIKI KAISHA, Tokyo (JP)

(72) Inventor: Masakatsu Sakurai, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/497,939

(22) Filed: Apr. 26, 2017

(65) Prior Publication Data
US 2017/0316291 A1 Nov. 2, 2017

(30) Foreign Application Priority Data

May 2, 2016 (JP) ................. 2016-092731

(51) Int. Cl.
*G06K 15/02* (2006.01)
*H04N 1/60* (2006.01)
*G06F 3/12* (2006.01)

(52) U.S. Cl.
CPC ....... *G06K 15/1852* (2013.01); *G06F 3/1286* (2013.01); *G06K 15/188* (2013.01); *G06K 15/1872* (2013.01); *G06K 15/1889* (2013.01); *H04N 1/6027* (2013.01); *H04N 1/6072* (2013.01)

(58) Field of Classification Search
None
See application file for complete search history.

(56) References Cited

U.S. PATENT DOCUMENTS

| | | | | |
|---|---|---|---|---|
| 6,025,927 A * | 2/2000 | Honma | ................... | G06K 15/02 358/1.1 |
| 9,305,251 B2 * | 4/2016 | Yaginuma | .......... | G06K 15/1878 |
| 2002/0191202 A1* | 12/2002 | Furuya | ................. | H04N 1/3871 358/1.9 |
| 2009/0059300 A1* | 3/2009 | Torisaki | .................. | G06T 11/60 358/1.18 |
| 2009/0168085 A1* | 7/2009 | Suzuki | ................... | G06K 15/02 358/1.9 |
| 2015/0116782 A1* | 4/2015 | Bruwer | .................... | H04N 1/41 358/3.24 |

FOREIGN PATENT DOCUMENTS

JP 2009-129342 A 6/2009
JP 2014110007 A * 6/2014 ......... G06K 15/1825

* cited by examiner

*Primary Examiner* — Thomas D Lee
(74) *Attorney, Agent, or Firm* — Canon U.S.A., Inc. IP Division

(57) ABSTRACT

In a pixel of a part where two objects are superimposed, pixel values of the objects are compared to thereby set an attribute of the pixel to an attribute of one of the objects.

6 Claims, 12 Drawing Sheets

FIG. 3

| | ATTRIBUTE | DITHER TYPE | RENDERING INTENT |
|---|---|---|---|
| 304 | TEXT | RESOLUTION PRIORITY | SATURATION PRIORITY (Saturation) |
| 305 | GRAPHIC | GRADATION PRIORITY | WHOLE COMPRESSION (Perceptual) |
| 306 | IMAGE | GRADATION PRIORITY | WHOLE COMPRESSION (Perceptual) |

Columns: 301, 302, 303

FIG. 4

ATTRIBUTE FLAG

| 0000 | : UNDRAWN |
| 0001 | : GRAPHIC |
| 0010 | : TEXT |
| 0100 | : IMAGE |
| 1XXX | : ADOPT BACKGROUND ATTRIBUTE |

FIG. 12A

```
<FixedPage Width="793.76" Height="1122.56" xmlns="http://schemas.microsoft.com/xps/2005/06" xml:lang="und">
  <!--Microsoft XPS Document Converter (MXDC) Generated! Version: 0.3.7601.17514 -->
  <Path Data="F1 M 169.12,150.08 L 364,150.08 364,299.04 169.12,299.04 z" Fill="#ff3e3e3e" />       ~1201
  <Glyphs RenderTransform="0.195313,0,0,0.195313,0,0" Fill="#fff2f2f2" FontUri="/Documents/1/Resources/Fonts/6D5DE97C-
  AAC4-4195-8B7E-B37034962E3.odttf" FontRenderingEmSize="327.68" StyleSimulations="None" OriginX="1028.16" OriginY="1268.96"       ~1202
  Indices="36,67;37,66;38,73;3" UnicodeString="ABC" />
  <Path Data="M 265.92,218.72 L 434.08,218.72 434.08,354.08 265.92,354.08 z" >
    <Path.Fill>
      <ImageBrush ImageSource="/Documents/1/Resources/Images/1.PNG" ViewBox="0,0,1051,846"                                         ~1203
      TileMode="None" ViewboxUnits="Absolute" ViewportUnits="Absolute" Viewport="265.92,218.72,168.16,135.36" />
    </Path.Fill>
  </Path>
</FixedPage>
```

INFORMATION PROCESSING APPARATUS FOR SETTING AN ATTRIBUTE OF A PIXEL BASED ON A CONFORMITY BETWEEN PIXEL VALUES OF OBJECTS, INFORMATION PROCESSING METHOD FOR SETTING AN ATTRIBUTE OF A PIXEL BASED ON A CONFORMITY BETWEEN PIXEL VALUES OF OBJECTS, AND NON-TRANSITORY COMPUTER READABLE MEDIUM FOR SETTING AN ATTRIBUTE OF A PIXEL BASED ON A CONFORMITY BETWEEN PIXEL VALUES OF OBJECTS

BACKGROUND OF THE INVENTION

Field of the Invention

The present disclosure relates to an image processing apparatus, an image processing method, and a storage medium.

Description of the Related Art

Heretofore, when printing is performed using application software, a printer driver converts drawing data from the application software into drawing data of a drawing format, which can be processed by an output printer, and sends the converted drawing data to a printer. To perform higher-definition printing, the printer driver classifies the drawing data from the application software into drawing attributes, such as text, graphics, and images, and performs conversion processing using optimum image generation processing for each attribute. The printer driver also performs similar conversion processing within the printer. For example, image processing is performed by placing a priority on resolution and saturation for text, placing a priority on gradation for graphics, and placing a priority on gradation for images. This processing makes it possible to perform printing text more clearly and printing graphics and images more smoothly.

In some application software, a partial area of a graphic is converted into a rectangular image and a printing instruction is sent as an overwrite image to the printer driver and the printer. When the driver receives a sophisticated drawing instruction that is not supported by the printer, all graphics included in an area including the drawing may be converted into a bitmap format to be sent to the printer in the overwrite instruction as the rectangular image. In these cases, the drawing attribute in an area in which a graphic is converted into a rectangular image is different from the drawing attribute in an area in which a graphic is not converted into a rectangular image. Accordingly, if optimum image processing is performed in accordance with the drawing attributes, a step occurs at a boundary between colors in output from the printer, although the colors are the same color in the drawing data.

Japanese Patent Laid-Open No. 2009-129342 discloses a technique in which when the density of a background graphic is the same as the density of text drawn on the background, the attribute of the text is matched to that of the graphic and output in the same banalization pattern as that of the background. Thus, a phenomenon that text that is invisible because the density of the text is the same as the density of the background on the display appears during printing.

As described above, when the same designated colors have different attributes, the drawing result may show different colors. This causes a phenomenon that a boundary appears between an area having an image attribute and an area having an attribute other than the image attribute.

SUMMARY OF THE INVENTION

The present disclosure has been made in view of the above-mentioned programs, and an object of the present disclosure is to appropriately set attributes of pixels in overlapping areas so as to obtain a high-quality printing result even when two objects are drawn in a superimposed manner.

Accordingly, the present disclosure is an information processing apparatus that sets an attribute of a pixel in a part of a second object superimposed on a first object, the image processing apparatus including: a comparison unit configured to compare a pixel value of the first object in the pixel with a pixel value of the second object in the pixel; and a setting unit configured to set, based on a result of the comparison by the comparison unit, the attribute of the pixel to one of an attribute of the first object and an attribute of the second object.

Further features of the present invention will become apparent from the following description of exemplary embodiments (with reference to the attached drawings).

BRIEF DESCRIPTION OF THE DRAWINGS

FIG. 3 is a table illustrating a relationship between image processing and an attribute of drawing data.

FIG. 4 is an explanatory diagram illustrating attribute information.

FIGS. 12A to 12B are explanatory diagrams illustrating an example of the post-processing.

DESCRIPTION OF THE EMBODIMENTS

Figure 1:
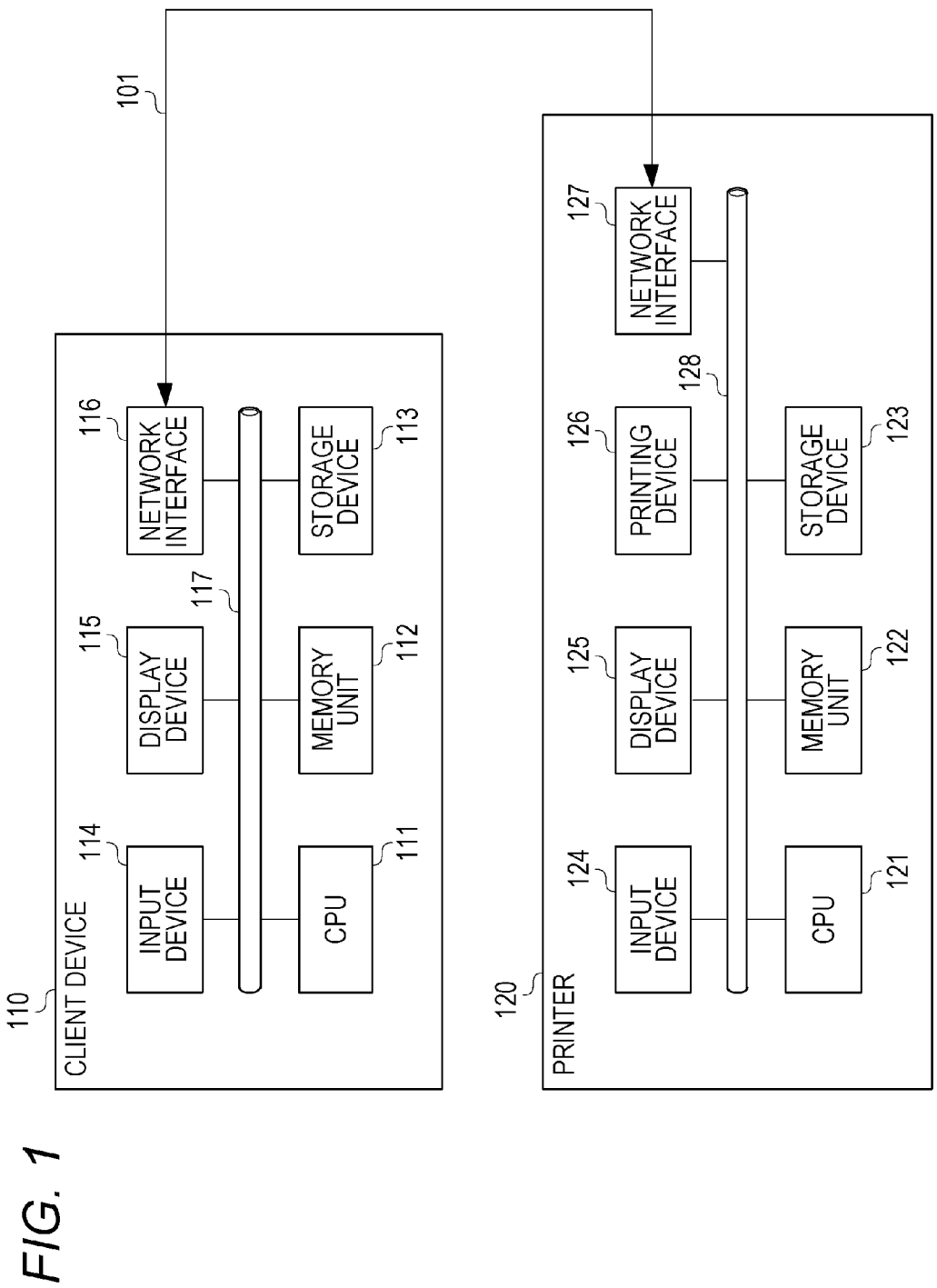
FIG. 1 is a diagram illustrating a hardware configuration example of a printing system.

First, an example of a plurality of pieces of drawing data having different attributes is described. FIG. 12A is a diagram illustrating an example of drawing data input from application software to a printer driver and a printer. Drawing data 1200 illustrated in FIG. 12A is described in an XPS (XML Paper Specification) format. Note that the drawing data format from the application software is similar to other drawing data formats such as a GDI format defined by Microsoft Corporation. First data 1201 is data describing that a rectangular graphic is drawn in "dark gray". Second data 1202 is data describing that a character string "ABC" is drawn in "light gray" at a position in a rectangular graphic described in the first data. Third data 1203 is data describing that overwrite drawing of an image of a PNG format is performed at a position where the image partially overlaps the rectangular graphic of the first data 1201 and the character string of the second data 1202.

Figure 12B:
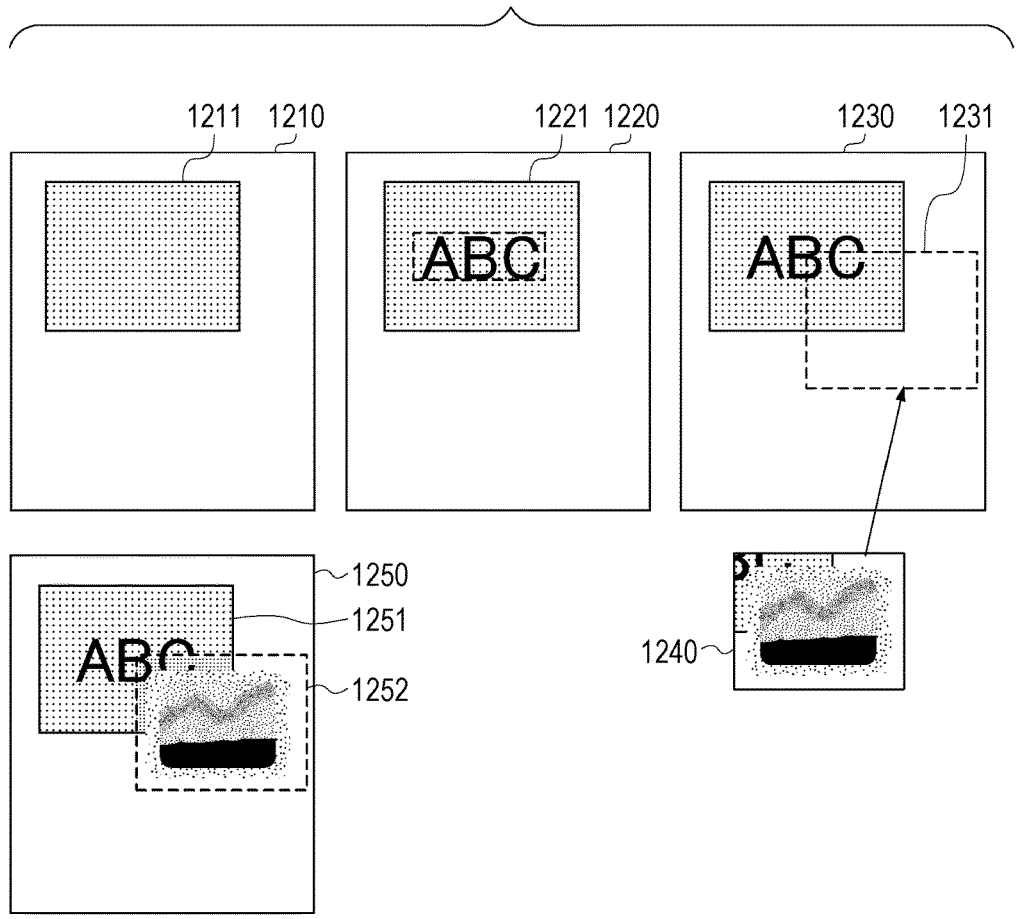

FIG. 12B is a diagram illustrating an image indicating processing results of drawing processing executed in accordance with the first data 1201, the second data 1202, and the third data 1203 in the order of description in the drawing data 1200 illustrated in FIG. 12A. An image 1210 is an image obtained when the corresponding drawing processing is performed on the first data 1201. In the image 1210, a rectangular graphic 1211 is drawn. An image 1220 is an image obtained when the corresponding drawing processing is performed on the second data 1202. A text 1221 of "ABC" is drawn on the rectangular graphic 1211 in the image 1210 in a superimposed manner. When the corresponding drawing processing is performed on the third data 1203, an image 1240 of "1.PNG" of the third data 1203 is drawn in an area 1231 on the image 1230 in a superimposed manner. An image 1250 is an image obtained after the corresponding drawing processing is performed on the third data 1203.

In the image 1250, an image 1252 is drawn on the rectangular graphic 1251 in a superimposed manner. The image 1252 and the rectangular graphic 1211 and text 1221 which are drawn prior to the image 1252 indicate that there is a difference between the colors of the same pixels. Thus, when the same designated colors have different attributes, the drawing result may show that the colors are different colors.

Embodiments of the present disclosure will be described below with reference to the drawings.

FIG. 1 is a diagram illustrating a hardware configuration example of a printing system of this embodiment. The printing system of this embodiment is a system that converts drawing data from application software into data for a printer and executes printing. The printing system includes a client device 110 and a printer 120. In this case, the client device 110 is an example of an information processing apparatus, and is, for example, a PC. The client device 110 and the printer 120 are connected via a network 101. The network 101 is a LAN, a WAN, or the like. LAN stands for Local Area Network. WAN stands for Wide Area Network.

The client device 110 includes a CPU 111, a memory unit 112, a storage device 113, an input device 114, a display device 115, and a network interface 116. CPU stands for Central Processing Unit. The CPU 111 controls the entire client device 110. The network interface 116 allows the client device 110 to connect to the printer 120 and other devices of the system via the network 101. The memory unit 112 is, for example, a semiconductor random access memory (RAM), or a Read Only Memory (ROM). RAM stands for Random Access Memory. ROM stands for Read Only Memory.

The storage device 113 typically includes a hard disk drive and a flash memory and is used to store an OS, a program, and data. OS stands for Operating System. Note that the function and processing of the client device 110 to be described later are implemented in such a manner that the CPU 111 reads out a program stored in the storage device 113 or the like and executes the program.

The client device 110 includes the input device 114, such as a keyboard or a mouse, and the display device 115 for performing display. The client device 110 uses an operation system, such as LINUX or Microsoft Windows (registered trademark), and the components 111 to 116 of the client device 110 that perform communication via an interconnection bus 117.

The printer 120 includes a CPU 121, a memory unit 122, a storage device 123, an input device 124, a display device 125, a printing device 126, and a network interface 127. The CPU 121 controls the entire printer 120. The network interface 127 allows the printer 120 to be connected to the client device 110 and other devices of the system via the network 101. The memory unit 122 is composed of, for example, a semiconductor random access memory (RAM) and a Read Only Memory (ROM). The storage device 123 typically includes a hard disk drive and a flash memory and is used to store an OS, a program, and data. Note that the function and processing of the client device 110 to be described later are implemented in such a manner that the CPU 11 reads out a program stored in the storage device 113 or the like and executes the program.

The printer 120 includes the input device 124, such as a touch panel and buttons, the display device 125 for performing display, and the printing device 126 for printing out data on paper. The printer 120 uses a device built-in type operation system and the components 121 to 127 of the printer 120 which perform communication via an interconnection bus 128.

Figure 2:
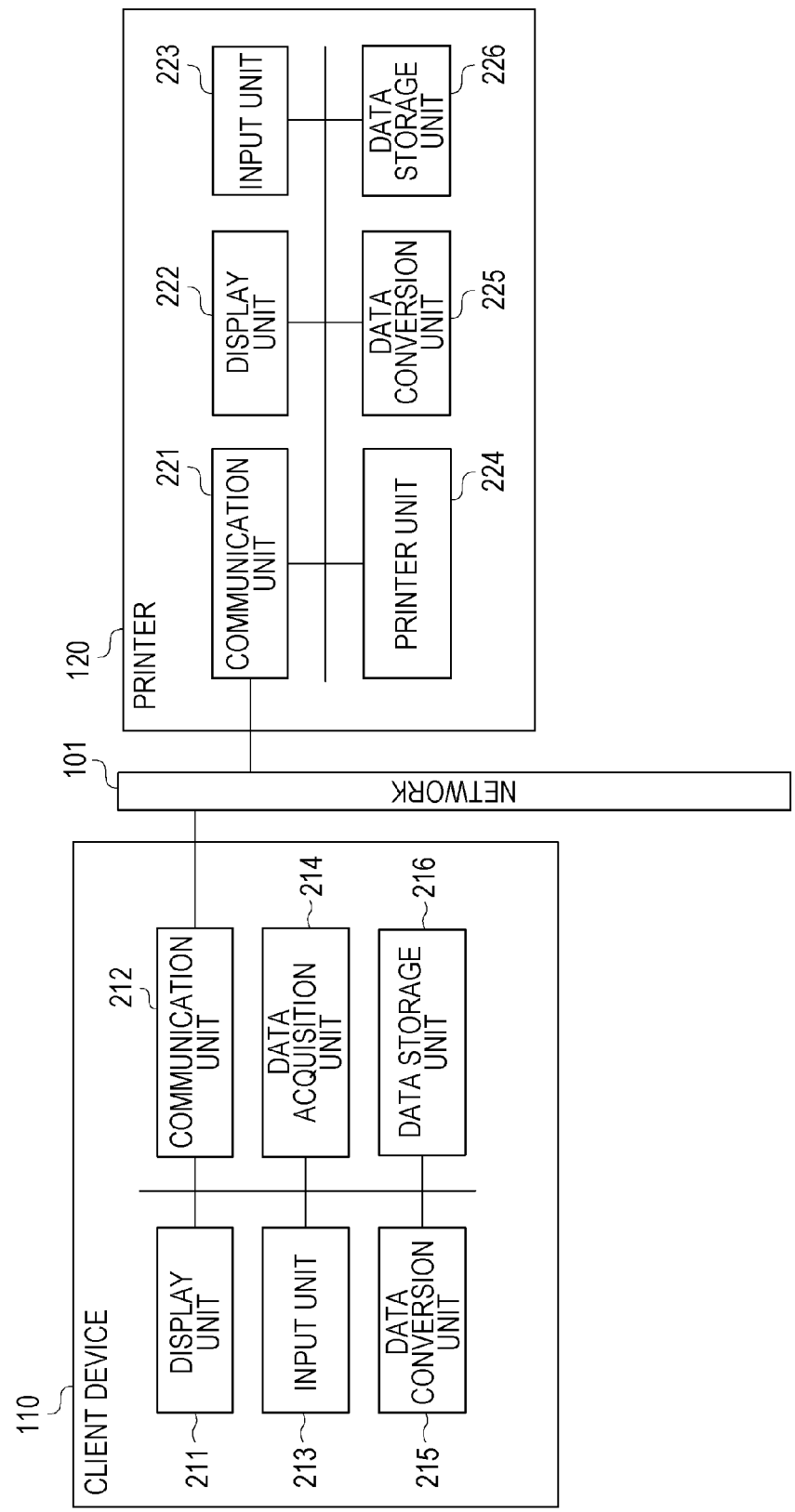
FIG. 2 is a diagram illustrating a software configuration of the printing system.

FIG. 2 is a diagram illustrating a software configuration of the printing system. In the printing system, the client device 110 generates printing data (e.g., PDL data) compatible with the printer 120 from the drawing data indicated by a printing instruction, and transmits the generated printing data to the printer 120. Then, the printer 120 prints out the data.

The client device 110 includes a display unit 211, a communication unit 212, an input unit 213, a data acquisition unit 214, a data conversion unit 215, and a data storage unit 216. The display unit 211 performs various data displays. The communication unit 212 is connected to the network 101 and performs network communication with other devices. The input unit 213 inputs an instruction to the application software and a printing instruction in accordance with a user's operation.

The data acquisition unit 214 acquires data of the application software from the data storage unit 216 which is described later. The data acquisition unit 214 acquires drawing data (e.g., data of an XPS or GDI format) generated by the OS during printing. The data acquisition unit 214 also acquires printing data (e.g., data of an intermediate format) generated during the data conversion processing. The data conversion unit 215 performs the drawing data conversion processing for converting the drawing data into printing data (e.g., PDL data) compatible with the printer 120.

The data storage unit 216 stores the data of the application software. The data storage unit 216 also stores drawing data (e.g., data of an XPS or GDI format) generated by the OS during printing from the application software, printing data (e.g., data of an intermediate format) being processed in the printing data conversion processing, and the like. In this embodiment, drawing data of the XPS format is described as an example of the drawing data generated by the OS. Although details of the data used during the data conversion processing will be described later, the data storage unit 216 stores the acquired drawing data, temporal data (e.g., a bitmap and attribute information) obtained during data conversion, printing data (e.g., data of the intermediate format) generated from the drawing data, and the like.

The printer 120 outputs a printing data (e.g., PDL data). The printer 120 includes a communication unit 221, a display unit 222, an input unit 223, a printer unit 224, and a data conversion unit 225. The communication unit 221 is connected to the network 101 and performs network communication with other devices. The display unit 222 performs display on the printer 120. The input unit 223 inputs data and instructions in accordance with a user's operation. The printer unit 224 prints out the printing data on paper. The data conversion unit 225 performs drawing data conversion processing for converting the printing data into data for the printer unit. The data storage unit 226 stores printing data (e.g., data of the intermediate format) being processed during the printing data conversion processing, and the like. Although details of the data used during the data conversion processing will be described later, the data storage unit 226 stores the acquired drawing data, temporal data (e.g., a bitmap and attribute information) obtained during data conversion, printing data (e.g., data of the intermediate format) generated from the drawing data, and the like.

Next, an overview of processing by the printing system will be described. First, when the client device 110 receives a printing instruction from the application software, the CPU 111 loads a data conversion processing module stored in the storage device 113 into the memory unit 112 and executes the data conversion processing module. Thus, the CPU 111 controls the memory unit 112, the storage device 113, the input device 114, the display device 115, and the network interface 116, thereby performing the data conversion processing as described later.

The client device 110 transmits the generated printing data (e.g., PDL data) to the printer 120. In the printer 120, the CPU 121 controls the received printing data to be printed out from the printing device 126. In this case, the CPU 121 controls the memory unit 122, the storage device 123, the input device 124, the display device 125, the printing device 126, and the network interface 127.

FIG. 3 is a table illustrating a relationship between the attribute of the drawing data and image processing. The client device 110 performs optimum image processing based on the attribute of the drawing data. As illustrated in FIG. 3, the client device 110 stores an attribute, a dither type as a type of image processing, and a rendering intent in such a manner that these are associated with each other.

An attribute 301, a dither type 302, and a rendering intent 303 designate a resolution priority and a saturation priority for a text 304, designate a gradation priority and a whole compression for graphics 305, and designate a gradation priority and a whole compression for an image 306. The client device 110 performs image processing according to the attribute while referring to the correspondence table, thereby making it possible to generate printing data in such a manner that text can be printed more clearly and graphics and images can be printed more smoothly.

Note that in drawing data (object) from typical application software, text is described using font information and text code; graphics are described using a path coordinate value representing a graphic shape and a drawing method; and images are described using a size and color information of each pixel. Accordingly, the client device 110 can determine the attribute of the drawing data based on the description format.

FIG. 4 is an explanatory diagram illustrating attribute information of each pixel of a bitmap used when printing data is generated in the printing system. A flag indicating the attribute of the drawn image data is set in each pixel of the bitmap. Assume that, in this embodiment, the flag is a binary value. In an initial state where no drawing has been performed, "0000" indicating "undrawn" is set for all pixels. When graphics drawing is performed, "0001" indicating that the attribute of the drawing data is "graphic" is set for the pixel on which the graphics drawing is performed. When text drawing has been performed, "0010" indicating that the attribute of the drawing data is "text" is set for the pixel on which the text drawing has been performed. When image drawing has been performed, "0100" indicating that the attribute of the drawing data is "image" is set for the pixel on which the image drawing has been performed.

When drawing is performed on the same pixel in a superimposed manner, "1XXX" indicating the background attribute which shows that the attribute of the drawing data which has been already drawn is maintained is set. "1XXX" indicates that the digit in the place of "X" is maintained at the value indicated by the flag corresponding to the drawn attribute data and the most significant bit is set to "1". By referring to this flag for each pixel, it can be determined whether or not the attribute of the drawn drawing data has been adopted.

Figure 5:
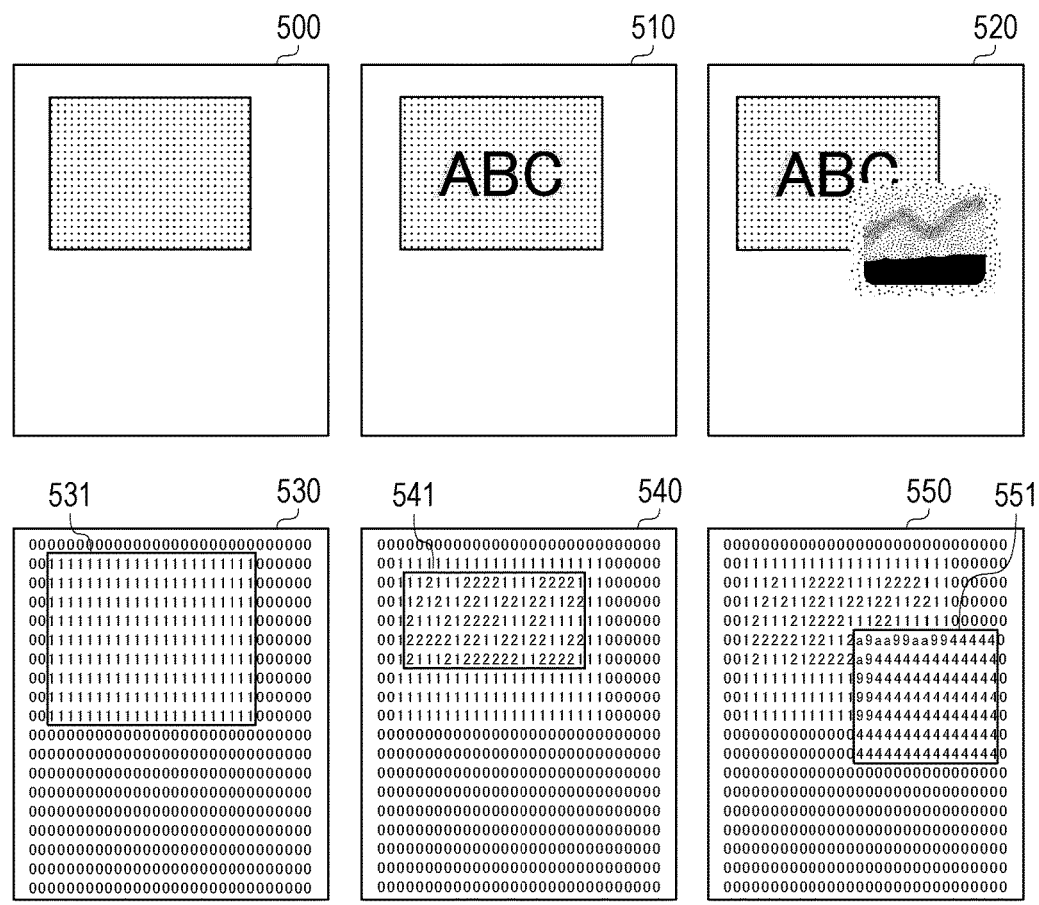
FIG. 5 is an explanatory diagram illustrating processing for converting drawing data into printing data.

FIG. 5 is an explanatory diagram illustrating processing for converting drawing data into printing data. An image 500 is an image obtained when the corresponding drawing processing is performed on the first data 1201 illustrated in FIG. 12A. An image 510 is an image obtained when the corresponding drawing processing is further performed on the second data 1202 illustrated in FIG. 12A from the state of the image 500. An image 520 is an image obtained when the corresponding drawing processing is further performed on the third data 1203 illustrated in FIG. 12A from the state of the image 510.

Bitmaps 530, 540, and 550 correspond to the images 500, 510, and 520, respectively. The attribute information of the corresponding image is allocated to each of the bitmaps 530, 540, and 550. The attribute information "1" illustrated in FIG. 5 indicates the graphics attribute of the attribute flag "0001" described above with reference to FIG. 4. The attribute information "2" indicates the text attribute of the attribute flag "0010". The attribute information "4" indicates the image attribute of the attribute flag "0100". The attribute information "9" indicates the image attribute "0001" for which the background attribute is continuously used. Specifically, the attribute information "9" indicates that when the second drawing data is superimposed on the first drawing data, which has been already drawn as a background, for one pixel, the image attribute set for the first drawing data is continuously used and allocated as the drawing attribute for this pixel. The attribute information "a" indicates the text attribute "0010" for which the background attribute is continuously used. The attribute information "c" indicates the drawing attribute "0100" for which the background attribute is continuously used.

In the image 500, a rectangular graphic is drawn, attribute information "1" of the rectangular graphic is allocated to pixels in an area 531 corresponding to the rectangular graphic in a bitmap 530. Note that undrawn attribute information "0" is allocated to pixels in an area other than the area 531. In the image 510, text is drawn on the rectangular graphic. In response to this, text attribute information "2" is allocated to predetermined pixels in an area 541 corresponding to the text in the bitmap 540. In the image 520, the image is drawn on the text. An area 551 in the bitmap 550 is an area corresponding to the image. Among the pixels in the area 551, image attribute information "4" is allocated to the pixels having the image attribute. Further, attribute information "9" or "a" indicating that the background attribute is continuously used is allocated to the pixels for which the background attribute is continuously used regardless of the image drawing. In the process of performing the drawing processing, the client device 110 refers to the attribute information about each pixel in the area 551, thereby making it possible to generate the printing data with which high-quality printing can be performed.

Figure 6:
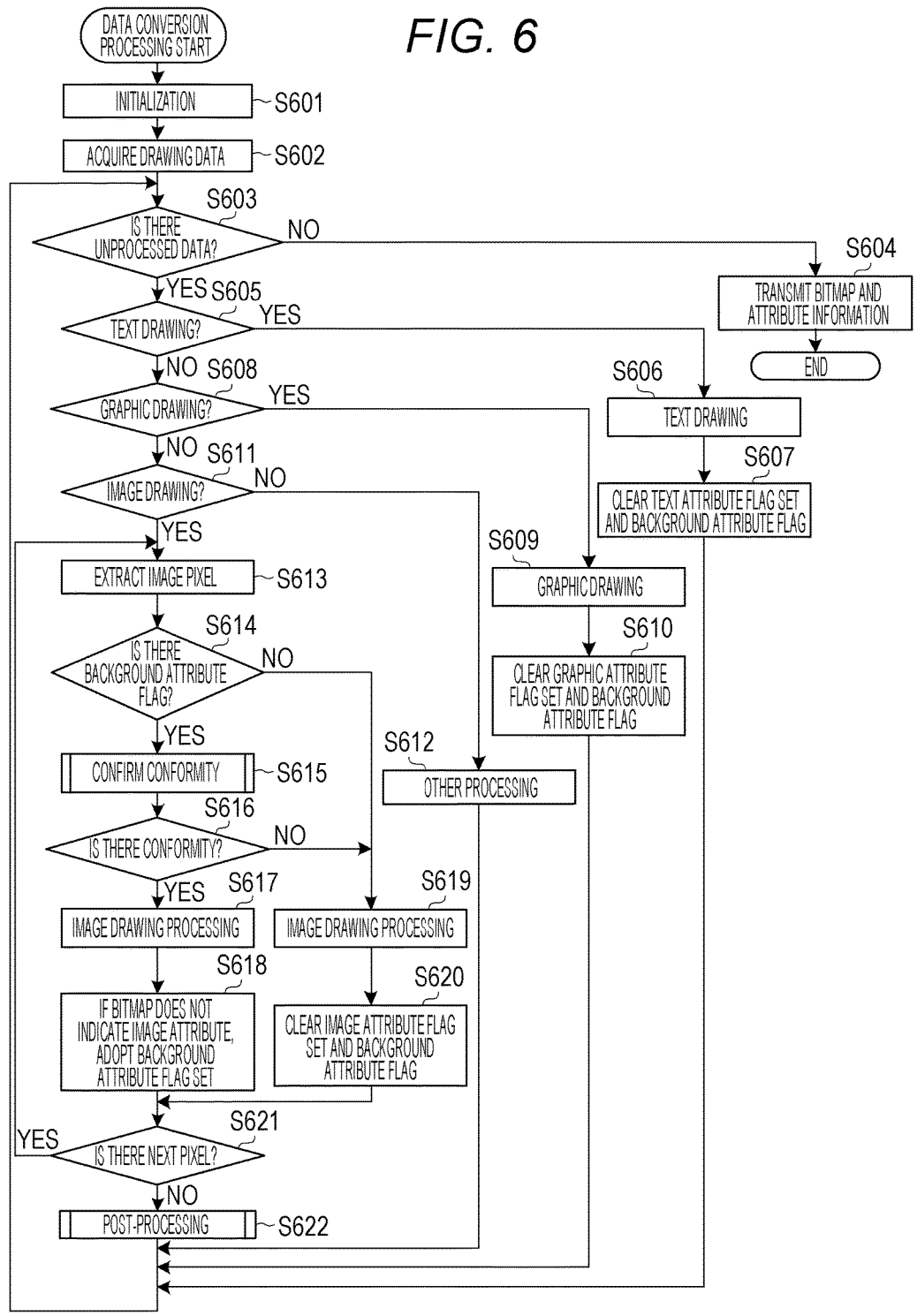
FIG. 6 is a flowchart illustrating data conversion processing.

FIG. 6 is a flowchart illustrating data conversion processing by the client device 110. The data conversion processing is processing for converting the drawing data from the application software into printing data for the printer 120 (e.g., PDL data of the bitmap format). In S601, the data conversion unit 215 performs initialization of processing for the data conversion unit 215. Next, in S602, the data conversion unit 215 acquires the drawing data that is stored in the data storage unit 216 through the data acquisition unit 214 and is generated by the OS during printing. In this embodiment, the drawing data of the XPS format as illustrated in FIG. 12A is acquired.

Next, in S603, the data conversion unit 215 determines whether or not there is unprocessed drawing data. When unprocessed drawing data is present (YES in S603), the data conversion unit 215 advances the processing to S605. When unprocessed drawing data is not present (NO in S603), the data conversion unit 215 advances the processing to S604. In S604, the data conversion unit 215 transmits the bitmap information and attribute information that are generated and stored in the data storage unit 216 to the printer 120 through the communication unit 212, and terminates the data conversion processing.

On the other hand, in S605, the data conversion unit 215 extracts drawing data per drawing from the unprocessed drawing data. The drawing data per drawing that is extracted in S605 is hereinafter referred to as target drawing data. The data conversion unit 215 confirms the drawing attribute set for the target drawing data. When the attribute of the text drawing is set (YES in S605), the data conversion unit 215 advances the processing to S606. When the attribute of the graphics drawing is set (NO in S605, YES in S608), the data conversion unit 215 advances the processing to S609. When the attribute of the image drawing is set (NO in S605; NO in S608; and YES in S611), the data conversion unit 215 advances the processing to S613. In the other settings (NO in S605; NO in S608; and NO in S611), the data conversion unit 215 advances the processing to S612.

Whether or not the attribute is the text attribute can be determined based on whether or not the attribute is designated by "GlyphsFill" as indicated by the second data 1202 illustrated in FIG. 12A. Whether or not the attribute is the drawing attribute can be determined based on whether or not the attribute is designated by "Path Data" as indicated by the first data 1201 illustrated in FIG. 12A. Whether or not the attribute is the image drawing can be determined based on whether or not the attribute is designated by "ImageBrush" as indicated by the third data 1203 illustrated in FIG. 12A.

In S606, the data conversion unit 215 refers to the target drawing data, and performs text drawing processing on the corresponding area of the bitmap. Next, in S607, the data conversion unit 215 sets the text attribute to the attribute flag of the attribute information of each pixel corresponding to the target drawing data, clears a background attribute flag indicating that the background attribute is adopted, and then advances the processing to S603.

In S609, the data conversion unit 215 refers to the target image data, and performs graphics drawing processing on the corresponding area of the bitmap. Next, in S610, the data conversion unit 215 sets the graphics attribute to the attribute flag of the attribute information of each pixel corresponding to the target drawing data, clears the background attribute flag indicating that the background attribute is adopted, and then advances the processing to S603. In S612, the data conversion unit 215 performs other data processing and then advances the processing to S603.

In S613, the data conversion unit 215 sequentially extracts data corresponding to one pixel from the image data as the target drawing data. The data extracted in S613 is hereinafter referred to as target pixel data. When the drawing data is compressed, the data conversion unit 215 temporarily expands the data and then extracts the data. When the drawing data indicates a color image, the data conversion unit 215 extracts the data corresponding to one pixel of a color format, and when the data is not in RGB format, the data conversion unit 215 converts the data into the RGB format. Note that the data format of the drawing data is not limited to the RGB format, but instead any data format may be used as long as the format is the same format used when the data is converted into a bitmap in a subsequent stage. Also when a monochrome image is input, the data conversion unit 215 converts the data into the same format as the format used when the data is converted into a bitmap in the subsequent stage. For example, the bitmap is in an RGB color format, the data conversion unit 215 converts the monochrome image into RGB colors.

Next, in S614, the data conversion unit 215 confirms the attribute information allocated to reference pixels in the drawing data of the image attribute (e.g., the area 551 illustrated in FIG. 5). In this case, the reference pixels are a plurality of pixels located at predetermined positions. The reference pixels are, for example, a predetermined number of pixels arranged from a left end to the right of the image drawn based on the drawing data. In another example, the reference pixels may be a predetermined number of pixels arranged from a right end to the left of the image drawn based on the drawing data. In further another example, the reference pixels may be a predetermined number of pixels arranged at a lower end. When the background attribute flag indicating that the background attribute is adopted for all the reference pixels is set (YES in S614), the data conversion unit 215 advances the processing to S615. When a pixel for which the background attribute flag is not set is present (NO in S614), the data conversion unit 215 advances the processing to S619.

In S615, the data conversion unit 215 determines the conformity between the pixel value of the target pixel data and the pixel value at the position of the corresponding bitmap. The conformity determination processing (S615) will be described later with reference to FIG. 7. In S616, the data conversion unit 215 confirms the result of the conformity determination processing. When the data conversion unit 215 determines that the conformity is present (YES in S616), the data conversion unit advances the processing to S617. When the data conversion unit 215 determines that the conformity is not present (NO in S616), the data conversion unit advances the processing to S619.

In S617, the data conversion unit 215 performs image drawing processing on the corresponding pixel of the bitmap based on the target pixel data. Next, in S618, the data conversion unit 215 refers to the attribute information of the corresponding pixel of the bitmap. When the information does not indicate the image attribute, the data conversion unit 215 sets the background attribute flag indicating that the background attribute is adopted. After that, the data conversion unit 215 advances the processing to S621. Processing of S618 is an example of the setting processing for setting the attribute of the drawing data, which has been already drawn, to the pixel on the bitmap corresponding to the target pixel data.

On the other hand, in S619, the data conversion unit 215 performs image drawing processing on the pixel corresponding to the bitmap based on the target pixel data. Next, in S620, the data conversion unit 215 sets the image attribute to the attribute information of the pixel corresponding to the bitmap, and clears the background attribute flag. After that, the data conversion unit 215 advances the processing to S621. Processing of S620 is an example of the setting processing for setting the attribute of the image data to the pixel on the bitmap corresponding to the target pixel data.

In S621, the data conversion unit 215 confirms whether or not the target drawing data includes unprocessed pixel data. When unprocessed pixel data is present (next pixel data) is present (YES in S621), the data conversion unit 215 advances the processing to S613. When unprocessed pixel data is not present (NO in S621), the data conversion unit 215 advances the processing to S622. In S622, the data conversion unit 215 performs post-processing. The post-processing (S622) will be described later with reference to FIGS. 8 and 9.

Figure 7:
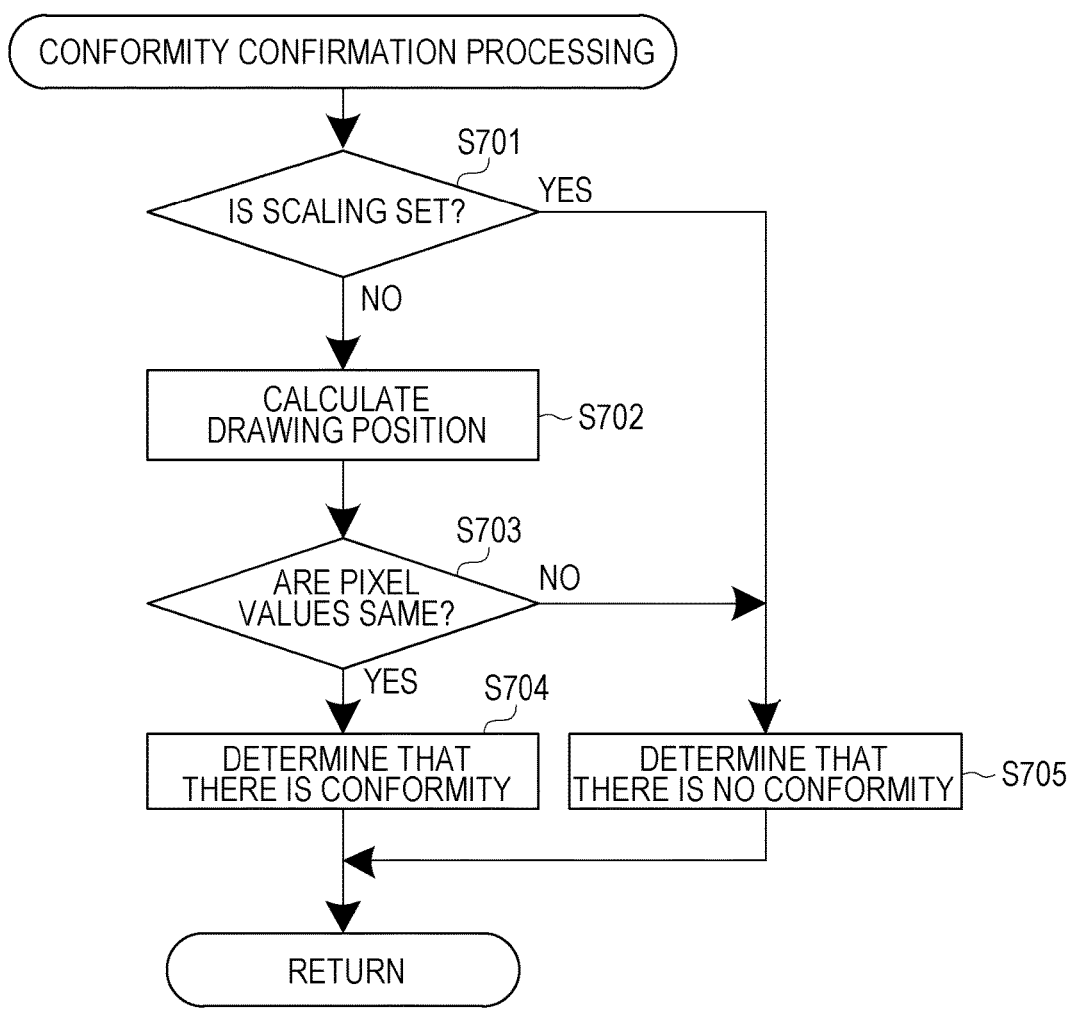
FIG. 7 is a flowchart illustrating detailed processing in conformity confirmation processing.

FIG. 7 is a flowchart illustrating detailed processing in the conformity confirmation processing (S615) described above with reference to FIG. 6. In S701, the data conversion unit 215 confirms whether or not scaling processing is set for the image data as the target drawing data. In this case, scaling processing is enlargement or reduction processing. When scaling processing is set (YES in S701), the data conversion unit 215 advances the processing to S705. When scaling processing is not set (NO in S701), the data conversion unit 215 advances the processing to S702.

In S702, the data conversion unit 215 calculates the pixel position on the bitmap on which the target pixel data extracted in S613 is to be drawn. Next, in S703, the data conversion unit 215 compares the pixel value of the target pixel data with the pixel value located at the position of the corresponding bitmap. When both pixel values are the same (YES in S703), the data conversion unit 215 advances the processing to S704 and determines that there is conformity between the pixel value of the target pixel data and the pixel value located at the position of the corresponding bitmap. Thus, the conformity confirmation processing ends. When both pixel values are different (NO in S703), the data conversion unit 215 advances the processing to S705 and determines that there is no conformity between the pixel value of the target pixel data and the pixel value located at the position of the corresponding bitmap. Thus, the conformity confirmation processing ends.

Figure 8:
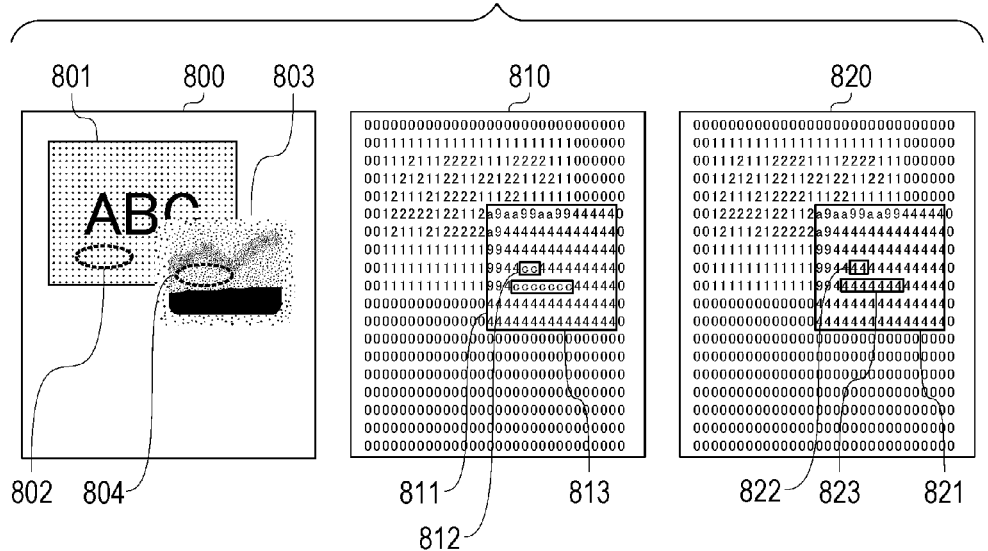
FIG. 8 is an explanatory diagram illustrating post-processing.

FIG. 8 is an explanatory diagram illustrating post-processing (S622) described above with reference to FIG. 6. An image 800 is an image obtained by processing up to S621 corresponding to the drawing data 1200 illustrated in FIG. 12A. In this case, text is superimposed on a graphic 801, and an image 803 is superimposed at a position partially overlapping the graphic 801. In this case, assume that pixels in an area 802 and an area 804 show the same value. A bitmap 810 corresponds to the image 800. An area 811 of the bitmap 810 corresponds to the image 803. A bitmap 820 is a bitmap obtained after the post-processing. Like in areas 812 and 813 of the bitmap 810, pixels which indicate the same pixel value in the image data and for which the background attribute is set are present. For such pixels, the data conversion unit 215 sets the image attribute as indicated by 822 and 823, like peripheral pixels, without adopting the background attribute, in the post-processing.

Figure 9:
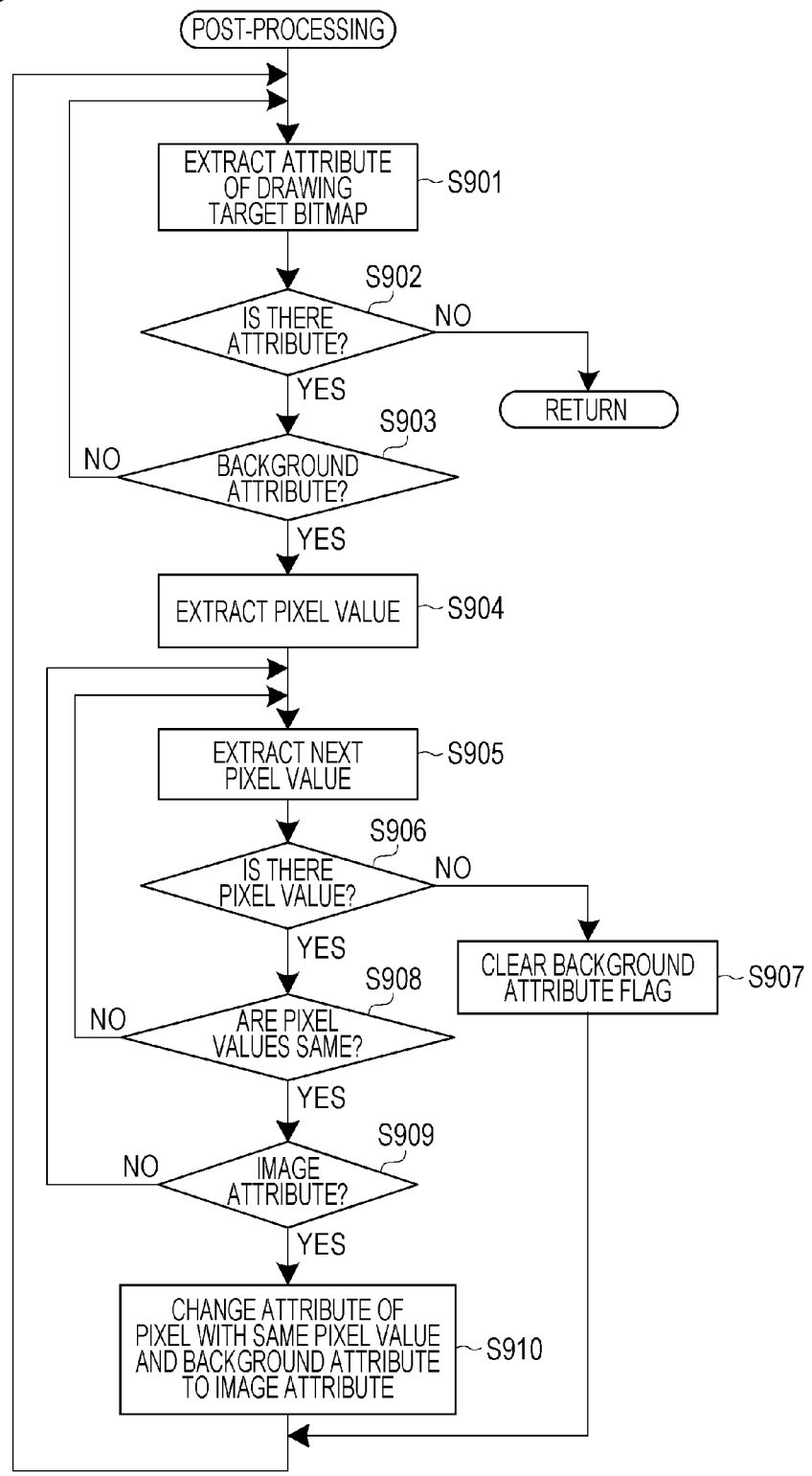
FIG. 9 is a flowchart illustrating post-processing.

FIG. 9 is a flowchart illustrating detailed processing in the post-processing (S622). In S901, the data conversion unit 215 extracts the attribute information corresponding to one unprocessed pixel from the attribute information of the bitmap of the image drawing target. The attribute information extracted in S901 is hereinafter referred to as target attribute information. In S902, the data conversion unit 215 confirms whether or not unprocessed attribute information has been extracted in S901. When the attribute information has not been extracted (NO in S902), the data conversion unit 215 terminates the post-processing. When the attribute information has been extracted (YES in S902), the data conversion unit 215 advances the processing to S903.

In S903, the data conversion unit 215 confirms whether or not the target attribute information indicates the background attribute. When the information indicates the background attribute (YES in S903), the data conversion unit 215 advances the processing to S904. When the information does not indicate the background attribute (NO in S903), the data conversion unit 215 advances the processing to S901. In this case, in S901, the data conversion unit 215 newly extracts the attribute information corresponding to one unprocessed pixel, and performs processing of S902 and subsequent steps. In S904, the data conversion unit 215 extracts the pixel value of the bitmap corresponding to the pixel for which the background attribute is set. Specifically, the pixel value extracted in S904 is a pixel value of a pixel corresponding to the attribute information extracted in S901.

Next, in S905, the data conversion unit 215 extracts the next pixel value of the bitmap. In this case, the next pixel value is a pixel value of a pixel adjacent to the pixel corresponding to the pixel value extracted in S904. Next, in S906, the data conversion unit 215 confirms whether or not the next pixel value has been extracted in S905. Note that the case where the next pixel value has not been extracted corresponds to a case where there is no pixel that is adjacent to the pixel corresponding to the pixel value extracted in S904. When the next pixel value has been extracted (YES in S906), the data conversion unit 215 advances the processing to S908. When the next pixel has not been extracted (NO in S906), the data conversion unit 215 advances the processing to S907. In S907, the data conversion unit 215 clears the background attribute flag allocated to the pixel corresponding to the pixel value extracted in S904. After that, the process advances to S901. In S901, the data conversion unit 215 extracts the attribute value corresponding to one unprocessed pixel, and continues the processing of S902 and subsequent steps.

Further, in S908, the data conversion unit 215 confirms whether or not the pixel value extracted in S904 is the same as the pixel value extracted in S905. When both pixel values are the same (YES in S908), the data conversion unit 215 advances the processing to S909. When both pixel values are different (NO in S908), the data conversion unit 215 advances the processing to S905. In this case, in S905, the data conversion unit 215 extracts the next pixel value of the pixel value extracted when the previous step S905 is executed, and continues processing of S906 and subsequent steps.

In S909, the data conversion unit 215 confirms whether or not a flag other than the background attribute flag is an image attribute flag. When the flag indicates the image attribute (YES in S909), the data conversion unit 215 advances the processing to S910. When the flag does not indicate the image attribute (NO in S909), the data conversion unit 215 advances the processing to S905. In S910, the data conversion unit 215 changes, to the image attribute, the attribute of the pixel which has the same pixel value as the pixel value extracted in S904 and for which the background attribute flag is set, for all drawing target bitmaps. Specifically, the data conversion unit 215 sets the image attribute flag for the pixel which has the same pixel value as the pixel value extracted in S904 and for which the background attribute flag is set. Further, the data conversion unit 215 clears the background attribute flag. After that, the data conversion unit 215 advances the processing to S901.

Thus, assume that a pixel having a pixel value that is the same as the pixel value of the pixel for which the attribute corresponding to the drawn pixel value is set and for which an attribute other than the attribute of the image data is set is present. In this case, the data conversion unit 215 changes the attribute of the pixel, for which the attribute corresponding to the drawn pixel value is set, to the attribute of the image data. This processing of S910 is an example of the change processing.

As described above, the client device 110 according to this embodiment can set an appropriate attribute to each pixel to be superimposed when image data is superimposed on the drawing data, which has been already drawn, and is drawn. Accordingly, the client device 110 can generate printing data with which a high-quality printing result can be obtained. Furthermore, even when drawing data are input in different drawing formats, the same image processing can be performed on the drawing data, which makes it possible to prevent a phenomenon that colors and densities appear differently from the original ones.

As a first modified example, the data conversion unit 215 may determine whether or not there is conformity based on the result of the comparison between the pixel value of the target pixel data and the pixel value located at the position of the corresponding bitmap. Specific conditions for the determination are not limited to the embodiments. In another example, the data conversion unit 215 may determine that there is conformity when the difference between the pixel value of the target pixel data and the pixel value located at the position of the corresponding bitmap is a value in a predetermined range. In still another example, the data conversion unit 215 may determine whether or not there is conformity based on the result of the comparison between the pixel value of the target pixel data and the pixel value of the pixel in the predetermined range based on the corresponding bitmap position.

Figure 10:
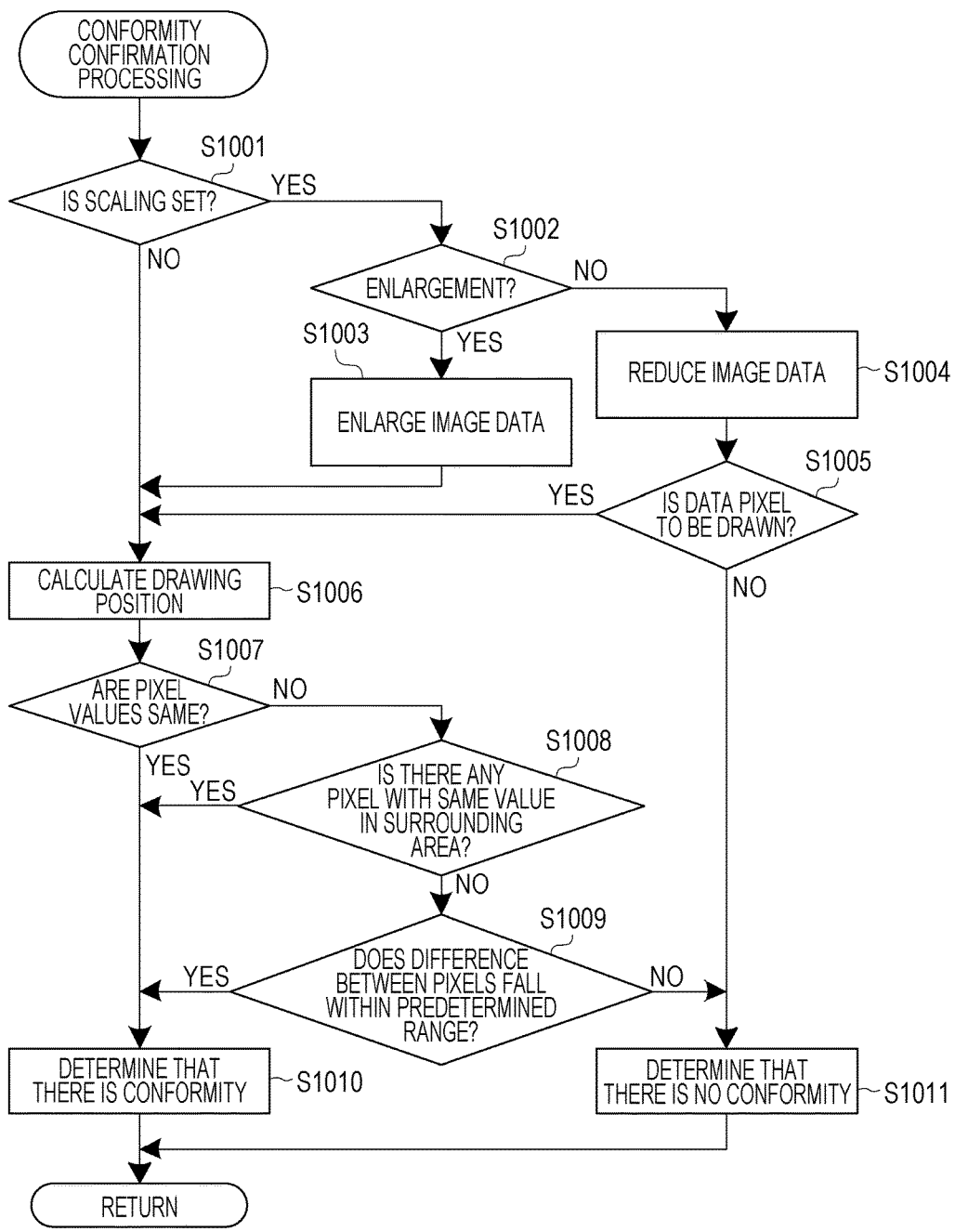
FIG. 10 is a flowchart illustrating a modified example of the conformity confirmation processing.

FIG. 10 is a flowchart illustrating a modified example of the conformity confirmation processing. In S1001, the data conversion unit 215 confirms whether or not scaling processing is set for the image data as the target drawing data. When scaling processing is set (YES in S1001), the data conversion unit 215 advances the processing to S1002. When scaling processing is not set (NO in S1001), the data conversion unit 215 advances the processing to S1006.

In S1002, the data conversion unit 215 confirms whether the setting for scaling processing indicates enlargement or reduction. When the setting indicates enlargement (YES in S1002), the data conversion unit 215 advances the processing to S1003. When the setting indicates reduction (NO in S1002), the data conversion unit 215 advances the processing to S1004. In S1003, the data conversion unit 215 performs enlargement processing on the image data as the target drawing data. Specifically, the data conversion unit 215 matches the image data to a plurality of pixels of the bitmap according to an enlargement rate. After that, the data conversion unit 215 advances the processing to S1006. For example, when the horizontal and vertical sizes are doubled, the number of pixels of the bitmap corresponding to the target pixel data is four.

On the other hand, in S1004, the data conversion unit 215 performs reduction processing on the image data as the target drawing data. Specifically, the data conversion unit 215 matches one pixel of the image data to a plurality of pixels of the bitmap according to a reduction rate. After that, the data conversion unit 215 advances the processing to S1005.

In S1005, the data conversion unit 215 determines whether or not the target pixel data indicate a pixel to be drawn as a result of the reduction. When the data conversion unit 215 determines that the target pixel data indicates a pixel to be drawn (YES in S1005), the data conversion unit 215 advances the processing to S1006. When the data conversion unit 215 determines that there is no pixel to be drawn (NO in S1005), the data conversion unit advances the processing to S1011. Note that in the case of reduction drawing of image data, when the data is a thinning processing target, it is determined that the data does not indicate a pixel to be drawn, and when the data is not the thinning processing target, it is determined that the data indicates a pixel to be drawn. In S1011, the data conversion unit 215 determines that there is no conformity between the pixel value of the target pixel data and the pixel value located at the position of the corresponding bitmap. Thus, the conformity confirmation processing ends.

In S1006, the data conversion unit 215 calculates a pixel position on the bitmap where the target pixel data extracted in S613 is to be drawn. Next, in S1007, the data conversion unit 215 compares the pixel value of the target pixel data with the pixel value located at the position of the corresponding bitmap. When both pixel values are the same (YES in S1007), the data conversion unit 215 advances the processing to S1010 and determines that there is conformity between the pixel value of the target pixel data and the pixel value located at the position of the corresponding bitmap. Thus, the conformity confirmation processing ends. When both values are different (NO in S1007), the data conversion unit 215 advances the processing to S1008.

Note that in S1003, when a plurality of pieces of target pixel data is associated with a plurality of pixels on the bitmap, the data conversion unit 215 calculates the position of each of the plurality of pixels in S1006. Further, in S1007, the data conversion unit 215 compares the pixel value of the target pixel data with the pixel value of each of the plurality of pixel positions of the corresponding bitmap. Further, the data conversion unit 215 determines that there is conformity when both pixel values are the same in all combinations in the comparison between the pixel value of the target pixel data and the pixel value of each of a plurality of pixel positions of the corresponding bitmap. Note that in another example, the data conversion unit 215 may determine that there is conformity when both pixel values are the same in a predetermined number of combinations or more. Thus, when scaling processing is set for the image data, the data conversion unit 215 compares the pixel value of the target pixel data after scaling and the pixel value of the bitmap.

In S1008, the data conversion unit 215 confirms whether or not there is a pixel having the same pixel value as that of the target pixel data by using pixels in a surrounding area based on the position of the bitmap corresponding to the target pixel data as a comparison target. Note that in the processing of S1008, a deviation of the drawing position due to the difference between an drawing algorithm during the generation of an input image generate and a drawing algorithm in this system. In this case, assume that the surrounding area is an area within a predetermined distance from a reference position when the position of the bitmap corresponding to the target pixel data is set as the reference position. The surrounding area is, for example, an area defined by one to two pixels in the vertical, horizontal, and oblique directions from the reference pixels. Note that the surrounding area is not limited to an area located within a predetermined distance from the reference position, as long as the surrounding area is an area preliminarily set based on the position of the bitmap corresponding to the target pixel data. In this case, the pixels in the surrounding area are an example of the pixel corresponding to the target pixel corresponding to the target pixel data.

When at least one pixel that is the same as the target pixel data is present (YES in S1008), the data conversion unit 215 advances the processing to S1010. When there is no pixel that is the same as the target pixel data (NO in S1008), the data conversion unit 215 advances the processing to S1009. In S1009, the data conversion unit 215 calculates the difference between the target pixel data and the pixel value of the comparison target pixel. Further, the data conversion unit 215 determines whether or not the difference is a value in a predetermined range. The predetermined value is preliminarily set by the client device 110. When the difference is a value in the predetermined range (YES in S1009), the data conversion unit 215 advances the processing to S1010. When the difference is not a value in the predetermined range (NO in S1009), the data conversion unit 215 advances the processing to S1011.

Figure 11:
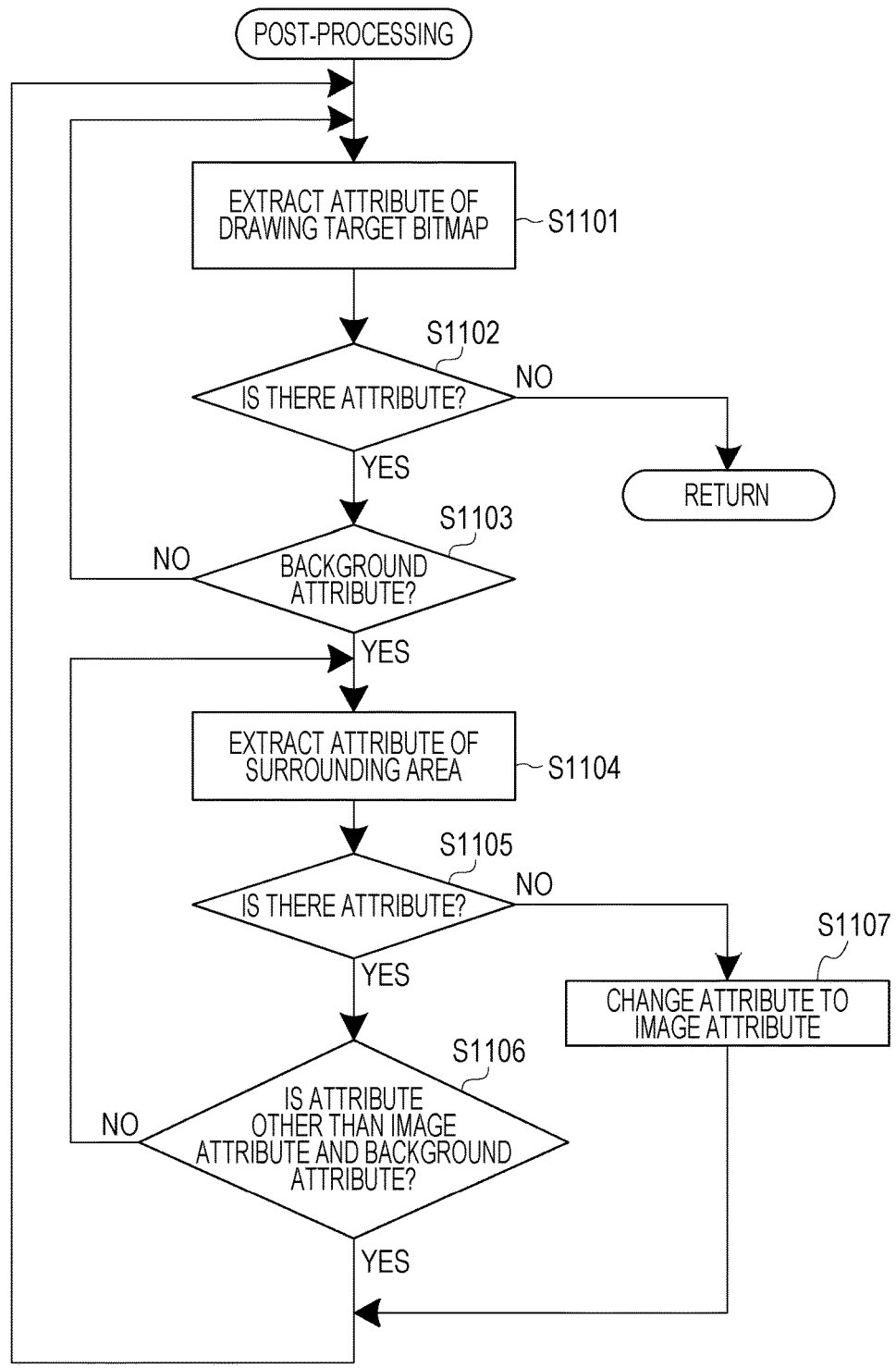
FIG. 11 is a diagram illustrating a modified example of the post-processing.

As a second modified example, the post-processing is not limited to that in the embodiments. FIG. 11 is a diagram illustrating a modified example of the post-processing. The data conversion unit 215 may execute the post-processing illustrated in FIG. 11, in addition to the post-processing described above with reference to FIG. 9, instead of the post-processing described above with reference to FIG. 9. The data conversion unit 215 may skip the post-processing. Specifically, the data conversion unit 215 may terminate the data conversion processing in S621 of FIG. 6. In the modified example illustrated in FIG. 11, the processing of S1101 to S1103 is similar to the processing of S901 to S903 described above with reference to FIG. 9. In S1103, when the attribute information extracted in S1101, i.e., the target attribute information indicates the background attribute (YES in S1103), the data conversion unit 215 advances the processing to S1104.

In S1104, the data conversion unit 215 extracts the attribute information allocated to the pixels in the surrounding area of the pixel corresponding to the attribute information extracted in S1101. The pixel corresponding to the attribute information extracted in S901 is a processing target of the following processing. This pixel is hereinafter referred to as a target pixel. Assume that the surrounding area is an area within a predetermined distance from a reference position when the position of the target pixel is set as the reference position. The surrounding area is, for example, an area defined by one to two pixels in the vertical, horizontal, and oblique directions from the reference pixels. Note that the surrounding area is not limited to the area within the predetermined distance from the reference position, as long as the area is preliminarily set based on the position of the target pixel. Note that the data conversion unit 215 excludes pixels outside of the drawing area of image data from the surrounding area.

Next, in S1105, the data conversion unit 215 confirms whether or not the attribute information of the surrounding area has been extracted. When the attribute information of the surrounding area is extracted (YES in S1105), the data conversion unit 215 advances the processing to S1106. When the attribute information of the surrounding area has not been extracted (NO in S1105), the data conversion unit 215 advances the processing to S1107. In S1106, the data conversion unit 215 confirms whether or not the attribute of each pixel in the surrounding area satisfies the conditions that the attribute is other than the image attribute and is other than the background attribute. When the conditions are satisfied (YES in S1106), the data conversion unit 215 advances the processing to S1101. In this case, in S1101, the data conversion unit 215 extracts the attribute information corresponding to one unprocessed pixel, and performs processing of S1102 and subsequent steps. When the conditions are not satisfied (NO in S1106), the data conversion unit 215 advances the processing to S1104.

On the other hand, in S1107, the data conversion unit 215 changes the attribute of the target pixel corresponding to the attribute information extracted in S1101 to the image attribute. Specifically, the data conversion unit 215 sets the image attribute flag and clears the background attribute flag. After that, the data conversion unit 215 advances the processing to S1101.

Further, as a third modified example, the data conversion processing according to this embodiment may be performed by the printer 120, instead of the client device 110. In another example, the data conversion processing may be performed by both the client device 110 and the printer 120.

As a fourth modified example, in the data conversion processing, the client device 110 may convert data into an intermediate code, which can be converted into a bitmap, instead of generating a bitmap.

Embodiments have been described in detail above. However, the present invention is not limited to the specific embodiments and can be altered or modified in various ways within the gist of the present disclosure described in the scope of claims.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-092731, filed May 2, 2016, which is hereby incorporated by reference herein in its entirety.

What is claimed is:

1. An image processing apparatus that sets an attribute of a pixel in a part of a second object superimposed on a first object, the image processing apparatus comprising:
   a memory device that stores a set of instructions; and
   at least one processor that executes the set of instructions to:
   compare a pixel value of the first object in the pixel with a pixel value of the second object in the pixel to determine whether or not there is conformity between the pixel value of the first object in the pixel and the pixel value of the second object in the pixel;
   set, in a case where it is determined that the conformity is present, the attribute of the pixel to the attribute of the first object, and
   set, in a case where it is determined that the conformity is not present, the attribute of the pixel to the attribute of the second object.

2. The image processing apparatus according to claim 1, wherein the at least one processor executes instructions in the memory device to:
   determine that the conformity is present in a case where a difference between a pixel value of the first object in the pixel and a pixel value of the second object in the pixel is a value within a predetermined range.

3. The image processing apparatus according to claim 1, wherein the at least one processor executes instructions in the memory device to:
   determine that the conformity is not present in a case where scaling processing is set for the second object.

4. The image processing apparatus according to claim 1, wherein the at least one processor executes instructions in the memory device to:
   determine, in a case where scaling processing is set for the second object, whether or not the conformity is present by comparing a pixel value of the first object in the pixel with a pixel value of the second object after the scaling processing in the pixel.

5. An information processing method that sets an attribute of a pixel in a part of a second object superimposed on a first object, an image processing method comprising:
   comparing a pixel value of the first object in the pixel with a pixel value of the second object in the pixel to determine whether or not there is conformity between the pixel value of the first object in the pixel and the pixel value of the second object in the pixel;
   setting, in a case where it is determined that the conformity is present, the attribute of the pixel to the attribute of the first object; and
   setting, in a case where it is determined that the conformity is not present, the attribute of the pixel to the attribute of the second object.

6. A non-transitory computer readable medium storing a program for executing an image processing method for setting an attribute of a pixel in a part of a second object superimposed on a first object, the image processing method comprising:
   comparing a pixel value of the first object in the pixel with a pixel value of the second object in the pixel to determine whether or not there is conformity between the pixel value of the first object in the pixel and the pixel value of the second object in the pixel;
   setting, in a case where it is determined that the conformity is present, the attribute of the pixel to the attribute of the first object; and
   setting, in a case where it is determined that the conformity is not present, the attribute of the pixel to the attribute of the second object.

* * * * *